Feb. 27, 1968 L. U. KIBLER 3,371,290
FIELD EFFECT TRANSISTOR PRODUCT MODULATOR
Filed April 30, 1965

INVENTOR
LYNDEN U. KIBLER
BY
Kenneth W. Mateer
ATTORNEY

United States Patent Office 3,371,290
Patented Feb. 27, 1968

3,371,290

FIELD EFFECT TRANSISTOR PRODUCT MODULATOR

Lynden U. Kibler, Middletown, N.J., assignor to Bell Telephone Laboratories, Incorporated, New York, N.Y., a corporation of New York Filed Apr. 30, 1965, Ser. No. 452,227
6 Claims. (Cl. 332—23)

This invention relates to product modulators and, more particularly, to field effect transistor device circuits for frequency shifting without simultaneously introducing higher order modulation products.

The shifting of an information bearing signal to a higher frequency has been long recognized as important in communication systems. One arrangement which is widely used comprises four rectifiers arranged in a ring, which furnishes an output corresponding to the product of two input oscillations. The undesired higher order modulation products which are generated inherently must, however, be filtered in the output.

Similarly, circuits employing diodes and simple transistors have been used as product modulators, but with the same problem of undesired modulation product generation.

The advent of the field effect transistor, described in detail in an article entitled, "The Field Effect Transistor," by G. C. Dacey and I. M. Ross which begins at page 1149 of volume 34 of the Bell System Technical Journal, has given rise to renewed interest in various circuit devices.

A theoretical analysis of symmetrical tetrode field effect devices is presented in an article by D. C. Latham, F. A. Lindholm, and D. J. Hamilton entitled "Low-Frequency Operation of Four-Terminal Field-Effect Transistors" which begins at page 300 of volume XI, No. 6, of IEEE Transactions on Electron Devices (June 1964). One arrangement analyzed in the Latham et al. article is characterized by a transconductance which is linearly related to the magnitude of an applied bias voltage.

The present invention involves use of such a linear transconductance characteristic.

In accordance with the invention, two field effect transistors, biased in the linear transconductance condition, are arranged in a balanced circuit to effect product modulation of two applied signals without significant generation of components other than signal frequencies and the first order sidebands about a carrier frequency.

More specifically, the modulator in accordance with the invention produces essentially no second or higher order modulation components due to circuit nonlinearities. The absence of such unwanted frequency components is a highly desirable advantage of the invention.

In particular, modulation is accomplished in a circuit comprising first and second symmetrical tetrode field effect transistors each having first and second gates, a source, and a drain, means for applying a first oscillation between a substantially zero reference potential and the first ones of the gates of the transistors, and means for applying a second oscillation between the second ones of the gates of the transistors and a point of bias potential higher than the reference potential. The sources of each transistor are grounded, and an output is taken across their drains.

The objects and features of the invention will be more clearly understood upon reference to the accompanying drawing in which.

Figure 1:
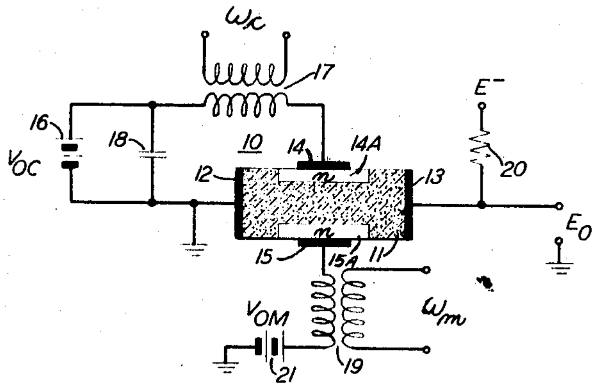
FIG. 1 is a circuit diagram of a field effect transistor biased in the linear transconductance condition.

With detailed reference now to FIG. 1 of the drawing, there is shown a field effect transistor 10 comprising a body 11 of semiconductive material of one conductivity type, with ohmic contacts 12, 13 at opposite ends thereof and gate ohmic contacts 14, 15 to regions 14A and 15A of semiconductive material of opposite conductivity type. Based on the direction of flow of majority charge carriers, ohmic contact 12 is termed the source, while ohmic contact 13 is termed the drain. In general, a field effect transistor can be regarded as a structure containing a semiconducting path, the conductivity of which is determined by the strength of an applied transverse field. For purposes of discussion, it will be assumed that region 11 comprises p type material and regions 14A, 15A—which are called the gates—comprise n type material. For a detailed discussion of the field effect transistor, see the article by Dacey and Ross referred to hereinbefore.

In FIG. 1, a first signal $\omega_c$ is coupled by transformer 17 to gate 14, which is biased by voltage $V_{OC}$ from source 16. Capacitor 18 bridges source 16. A second signal $\omega_m$ is simultaneously coupled through transformer 19 to gate 15, a bias voltage $V_{OM}$ being simultaneously applied from source 21. Source 12 is grounded and the output $E_O$ is taken across output load 20 connected between drain 13 and a source $E^-$. As is known, the voltage sources are adjusted to result in a reverse bias on rectifying barriers associated with gates 14 and 15.

The operation of the tetrode field effect transistor of FIG. 1 can be written in terms of drain current $i_D$, gate to source voltages $v_{g_1}$ and $v_{g_2}$, and the gate to drain transconductances $g_{m_1}$ and $g_{m_2}$, as $$i_D = g_{m_1} v_{g_1} + g_{m_2} v_{g_2} \qquad (1)$$

From the physical properties of the transistor, the transconductance at each gate can be further defined as $$g_{m_1} = \frac{g_{m_0}}{2}\left[1 - \left(\frac{v_{g_1}}{w_0}\right)^{1/2} + \frac{v_{g_1} - v_{g_2}}{4w_0}\right] \qquad (2)$$

and $$g_{m_2} = \frac{g_{m_0}}{2}\left[1 - \left(\frac{v_{g_2}}{w_0}\right)^{1/2} + \frac{v_{g_2} - v_{g_1}}{4w_0}\right] \qquad (3)$$

where $w_0$ is the pinch-off voltage for which the conductivity of the device falls substantially to zero.

Defining $v_{g_1}$ and $v_{g_2}$ as comprising the sum of a DC bias voltage and an AC signal $$v_{g_1} = V_{OM} + v_m \cos \omega_m t \qquad (4)$$

and $$v_{g_2} = V_{OC} + v_c \cos \omega_c t \qquad (5)$$

By successive substitution of Equations 4 and 5 into 2 and 3, and 2 and 3 then into 1, the drain current at the output terminal can be shown to contain the following components:

| Frequency | $\frac{2}{g_{m_0}} \cdot$ Magnitude |
|---|---|
| DC | $V_{OM} + V_{OC} - \frac{V_{OC} V_{OM}}{2w_0} + \frac{V_{OM}^2}{4w_0} + \frac{V_{OC}^2}{4w_0} + \frac{v_m^2}{8w_0} + \frac{v_c^2}{8w_0}$ |
| $\omega_m$ | $v_m - \frac{V_{OC} v_m}{2w_0} + \frac{V_{OM} v_m}{2w_0}$ |
| $\omega_c$ | $v_c - \frac{V_{OM} v_c}{2w_0} + \frac{V_{OC} v_c}{2w_0}$ |
| $2\omega_m$ | $\frac{v_m^2}{8w_0}$ |

$2\omega_c$ ---------------- $\frac{v_c^2}{8w_0}$ $\omega_c \pm \omega_m$ ------------ $\frac{-v_c v_m}{4w_0}$ Additionally, the terms $$\frac{(V_{OM}+v_m \cos \omega_m t)^{3/2}}{(w_0)^{1/2}}$$

and $$\frac{(V_{OC}+v_c \cos \omega_c t)^{3/2}}{(w_0)^{1/2}}$$

are present.

These terms can be expanded in a power series of $$n\frac{\omega_m}{2} \text{ and } n\frac{\omega_c}{2}$$

Thus, only a single set of sidebands exists, spaced about the carrier $\omega_c$. In addition, however, components exist at the carrier frequency, the signal frequency, and at their harmonic frequencies. Suppression of the carrier and its harmonics can be accomplished in the modulation circuit of FIG. 2.

Figure 2:
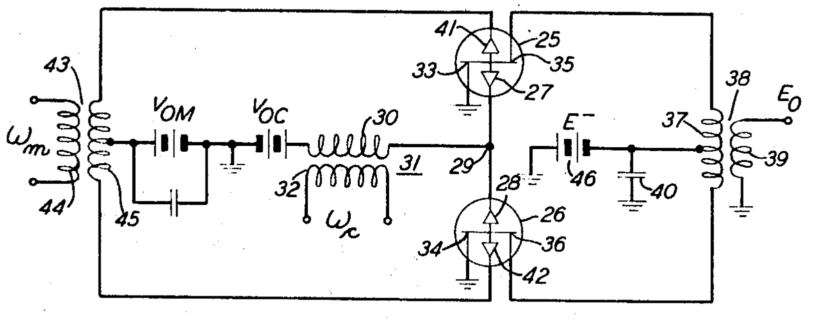
FIG. 2 is a schematic circuit diagram of a modulator in accordance with one embodiment of the invention.

In FIG. 2, two symmetrical tetrode field effect transistors 25, 26 are arranged in a balanced circuit with gates 27, 28 connected together at point 29, which is also connected through secondary winding 30 of transformer 31 to bias source $V_{OC}$, typically equal to ½ $w_0$, the pinch-off voltage for the transistors used. A carrier signal $\omega_c$ is applied to the primary winding 32 of transformer 31. Source connections 33, 34 of transistors 25, 26, respectively, are grounded and drain connections 35, 36 are connected through the primary winding 37 of output transformer 38. An output voltage $E_O$ is developed across secondary winding 39 of transformer 38. The center tap of primary winding 37, grounded for alternating currents through capacitor 40, is held at DC potential $E^-$ by voltage source 46.

The modulating signal $\omega_m$ is coupled to gates 41, 42 of transistors 25, 26 through a transformer 43 having a primary winding 44 and a secondary winding 45. A bias voltage $V_{OM}$ is applied at the center tap of secondary winding 45. Bias voltage $V_{OM}$ is adjusted to maintain the rectifying barriers associated with the gates 27, 28 biased in reverse and is typically very small, having a magnitude equal to the maximum voltage excursion of the modulating signal above ground potential.

With bias $V_{OM}$ on gates 27, 28; a bias $V_{OC}$ on gates 41, 42; and separate signals applied to each, the circuit operates in the linear transconductance condition described with reference to FIG. 1. Under this condition, no substantial generation of undesired frequency components occurs, and only a single set of sidebands is generated. Furthermore, the balanced circuit configuration ensures suppression of the carrier and its harmonically related frequencies.

Figure 3:
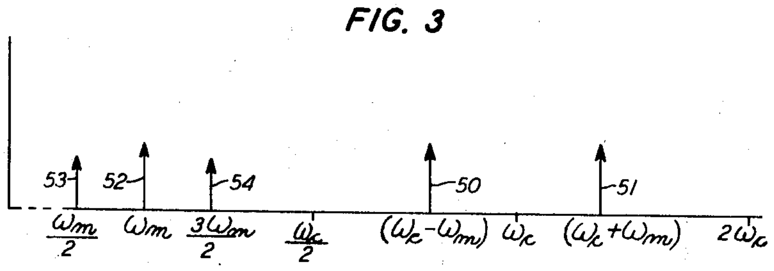
FIG. 3 is a frequency diagram given for purposes of explanation.

The relationships in the frequency plane are depicted in FIG. 3. Since the carrier frequency $\omega_c$ and its harmonics are suppressed by the balanced nature of the circuit of FIG. 2, the carrier amplitudes are illustrated as zero. The single pair of sidebands at $\omega_c - \omega_m$ and $\omega_c + \omega_m$, the modulation frequency $\omega_m$, and several harmonics are illustrated as arrows 50, 51, 52, 53, and 54, respectively.

The circuit of FIG. 2 can be constructed with symmetrical or asymmetrical field effect transistors. When symmetrical devices are used, the bias voltages are related as described. If, for the sake of convenience, asymmetrical devices are used, proper adjustment of bias voltages will simulate the symmetrical condition. Using Siliconix 3N89 tetrode transistors, specially biased to effect symmetrical tetrode transistor action by selecting $V_{OM}$ to be 1.6 volts and $V_{OC}$ to be 1.4 volts, and with a 1.2 megacycles carrier and a 15 kilocycles modulation signal, a gain of 10 decibels with carrier suppression of 35 decibels and second order sideband suppression of 75 decibels was obtained in the circuit of FIG. 2.

Such gain, coupled with the high second order sideband suppression, renders the modulator of FIG. 2 useful in situations in which linear product modulation is desired.

In all cases, it is to be understood that the above-described embodiment is only illustrative of the principles of the invention. Numerous and varied other embodiments can be devised by those skilled in the art in accordance with these principles without involving invention.

For example, while the description has been given with respect to a modulation device producing an upward shift in frequency, a frequency down conversion could be equally well obtained by proper selection of $\omega_m$ and $\omega_c$. Furthermore, linear phase sensing can be effected by applying substantially equal frequencies at the two inputs and monitoring the output amplitude.

What is claimed is:

1. Apparatus for shifting the frequency spectrum of a given signal to a different frequency range comprising first and second tetrode field effect devices each having a source connection, a drain connection, and first and second gate connections;

means for applying a carrier wave to one of the gates of each of said devices;

means for applying said given signal to the other of the gates of each of said devices;

means for maintaining said source connections at a common reference potential;

and means for extracting an output signal across said drains.

2. Means according to claim 1 in which said carrier wave and said given signal are applied in series with bias voltages adjusted to keep the rectifying barriers associated with the gates biased in reverse.

3. Means according to claim 1 in which said carrier wave is applied in series with a DC bias voltage equal to one-half the pinch-off voltage associated with said devices and said given signal is applied in series with a bias voltage at least equal to the maximum voltage excursion of said signal above said common reference potential.

4. Apparatus for producing a signal corresponding to the product of two input oscillations comprising:

a first tetrode field effect transistor having first and second gates, a source, and a drain;

a second tetrode field effect transistor having first and second gates, a source, and a drain;

said sources of said first and second transistors being held at a common reference potential;

means for applying a first oscillation between the first ones of said gates of said first and second transistors and a point of first bias potential having a magnitude greater than that of said reference potential;

means for applying a second oscillation between the second ones of said gates of said first and second transistors and a point of second bias potential of magnitude greater than that of said reference potential;

and means for deriving an output voltage across said drains of said first and second transistors.

5. The circuit according to claim 4 in which said second bias potential is equal to one-half the pinch-off voltage for said transistors.

6. Balanced circuit means for producing a suppressed carrier modulated signal comprising first and second tetrode field effect devices with sources held at a common reference potential, a carrier applied to a first pair of gates of said devices, a modulating signal applied to a second pair of gates of said devices, one of said pairs of gates being biased at a first potential having a magnitude greater than said reference potential, the other of said pairs of gates being biased at a second potential having a magnitude greater than the magnitude of said first potential, and means for extracting an output across a load connected between the drains of said devices.

References Cited

UNITED STATES PATENTS 3,075,090 1/1963 Bregman ---------- 307—88.5
3,204,160 8/1965 Sah.

ALFRED L. BRODY, *Primary Examiner.*